(12) United States Patent
Ahl et al.

(10) Patent No.: US 8,651,621 B2
(45) Date of Patent: *Feb. 18, 2014

(54) COATING FOR AN INK JET PRINTHEAD FRONT FACE

(75) Inventors: David Kenneth Ahl, Rochester, NY (US); Varun Sambhy, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/337,089

(22) Filed: Dec. 24, 2011

(65) Prior Publication Data

US 2012/0162312 A1    Jun. 28, 2012

Related U.S. Application Data

(63) Continuation-in-part of application No. 12/625,442, filed on Nov. 24, 2009, now Pat. No. 8,226,207.

(51) Int. Cl.
 *B41J 2/135* (2006.01)

(52) U.S. Cl.
 USPC .......................................... 347/45

(58) Field of Classification Search
 USPC ........... 347/34–36, 45, 46, 85–86, 89–91, 95, 347/47, 99, 100, 101, 104–105
 See application file for complete search history.

(56) References Cited

U.S. PATENT DOCUMENTS

| 6,130,687 A | 10/2000 | Bruil et al. |
| 6,659,587 B2 * | 12/2003 | Berg et al. ....................... 347/36 |

OTHER PUBLICATIONS

Office Action mailed Jan. 31, 2012 in U.S. Appl. No. 12/625,442, 18 pages.

* cited by examiner

*Primary Examiner* — Thinh Nguyen
(74) *Attorney, Agent, or Firm* — Maylou J. Lavoie (57) ABSTRACT

A coating for an ink jet printhead front face, wherein the coating comprises a low adhesion coating, wherein when the low adhesion coating is disposed on an ink jet printhead front face surface, jetted drops of ultra-violet gel ink or jetted drops of solid ink exhibit a low sliding angle with the printhead front face surface, wherein the low sliding angle is less than about 1° to less than about 30°. In embodiments, the low adhesion coating is an oleophobic coating that exhibits a contact angle of greater than about 35° with ultra-violet gel ink or solid ink. The coating can further be used for an ink jet printhead flexure chute.

20 Claims, 10 Drawing Sheets

COATING FOR AN INK JET PRINTHEAD FRONT FACE

This application is a continuation-in-part application of application Ser. No. 12/625,442, filed on Nov. 24, 2009, entitled "Coating For An Ink Jet Printhead Front Face," of Gregory J. Kovacs, Kock-Yee Law, Hong Zhao, and Varun Sambhy, which is hereby incorporated by reference herein in its entirety.

CROSS-REFERENCE TO RELATED APPLICATIONS

Copending Application U.S. Ser. No. 12/625,472, filed on Nov. 24, 2009, entitled "Image Conditioning Coating," with the named inventors Varun Sambhy, Bryan J. Roof, Kock-Yee Law, and Hong Zhao, the disclosure of which is totally incorporated herein by reference, discloses a contact leveling surface for an ink jet imaging member.

BACKGROUND

Disclosed herein is a coating for a front face of an ink jet printhead. More particularly, disclosed herein is a coating that prevents wetting, drooling, and flooding of ultra-violet gel ink and solid ink on an ink jet printhead front face. Further disclosed is a coating for a flexure chute of an ink jet printhead.

Fluid ink jet systems typically include one or more printheads having a plurality of ink jets from which drops of fluid are ejected towards a recording medium. The ink jets of a printhead receive ink from an ink supply chamber or manifold in the printhead which, in turn, receives ink from a source, such as a melted ink reservoir or an ink cartridge. Each ink jet includes a channel having one end in fluid communication with the ink supply manifold. The other end of the ink channel has an orifice or nozzle for ejecting drops of ink. The nozzles of the ink jets may be formed in an aperture or nozzle plate that has openings corresponding to the nozzles of the ink jets. During operation, drop ejecting signals activate actuators in the ink jets to expel drops of fluid from the ink jet nozzles onto the recording medium. By selectively activating the actuators of the ink jets to eject drops as the recording medium and/or printhead assembly are moved relative to one another, the deposited drops can be precisely patterned to form particular text and graphic images on the recording medium. An example of a full width array printhead is described in U.S. Patent Publication 20090046125, which is hereby incorporated by reference herein in its entirety. An example of an ultra-violet curable gel ink which can be jetted in such a printhead is described in U.S. Patent Publication 20070123606, which is hereby incorporated by reference herein in its entirety. An example of a solid ink which can be jetted in such a printhead is the Xerox ColorQube™ cyan solid ink available from Xerox Corporation.

Figure 1:
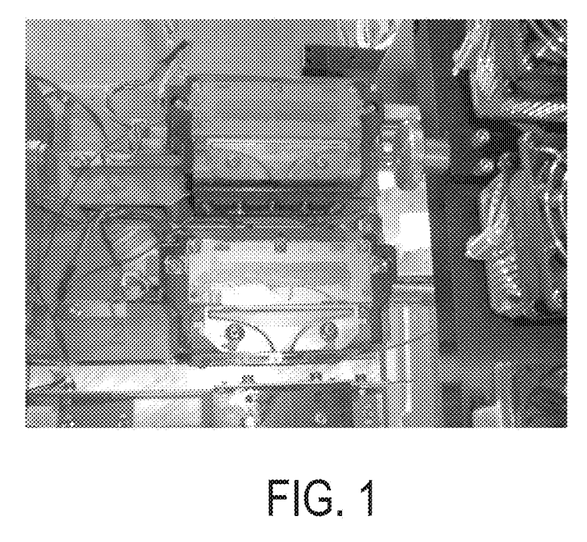
FIG. 1 is a photograph showing contamination of an ultra-violet gel ink over most of the nozzle area of a printhead front face having a polytetrafluoroethylene coating after a printing run.

One difficulty faced by fluid ink jet systems is wetting, drooling or flooding of inks onto the printhead front face. Such contamination of the printhead front face can cause or contribute to blocking of the ink jet nozzles and channels, which alone or in combination with the wetted, contaminated front face, can cause or contribute to non-firing or missing drops, undersized or otherwise wrong-sized drops, satellites, or misdirected drops on the recording medium and thus result in degraded print quality. Current printhead front face coatings are typically sputtered polytetrafluoroethylene coatings. When the printhead is tilted, the UV gel ink at a temperature of about 75° C. (75° C. being a typical jetting temperature for UV gel ink) and the solid ink at a temperature of about 105° C. (105° C. being a typical jetting temperature for solid ink) do not readily slide on the printhead front face surface. Rather, these inks flow along the printhead front face and leave an ink film which can interfere with jetting. For this reason, the front faces of UV and solid ink printheads are prone to wetting by the UV and solid inks. FIG. 1 is a photograph of a printhead front face after a printing run showing wetting and contamination of a UV gel ink over most of the nozzle area of the front face.

Maintenance procedures have been implemented in ink jet printers for preventing and clearing ink jet blockages and for cleaning the print head front face. A maintenance procedure for ink jet printers is described in U.S. Patent Publication 20080316247, which is hereby incorporated by reference in its entirety. Examples of maintenance procedures include jetting or purging ink from the ink jet channels and nozzles and wiping the printhead front face. Jetting procedures typically involve ejecting a plurality of drops from each ink jet in order to clear contaminants from the jets. Purging procedures typically involve applying an air pressure pulse to the ink reservoir to cause ink flow from all of the jets. The jetted ink may be collected in a waste reservoir such as a spittoon. The purged ink may be collected in a waste reservoir such as a waster tray. A wetted, contaminated printhead front face interferes with the collecting of the purged ink by preventing or reducing the ability of the ink to slide over the front face into the waste reservoir. Wiping procedures are usually performed by a wiper blade that moves relative to the nozzle plate to remove ink residue, as well as any paper, dust, or other debris that has collected on the print head front face. An example of a wiper assembly is described in U.S. Pat. No. 5,432,539, which is hereby incorporated by reference herein in its entirety. Jetting/purging and wiping procedures may each be performed alone or in conjunction with one another. For example, a wiping procedure may be performed after ink is purged through the jets in order to wipe excess ink from the nozzle plate.

As noted, a maintenance cycle can be used to clean contaminants from print heads used in solid ink printing. During this cycle, ink is purged from the head and directed to a waste tray. To prevent drops of ink from remaining on the print head, a wiper assembly is used. Since the stroke of the wiper assembly can be inadequate to fully remove ink from the print head, flexure chutes are mounted in the waste tray. These flexure chutes direct the ink into the waste tray, preventing contamination of the lower portion of the head (the "drip bib").

After the purge cycle, the ink can stick to the flexure chute or chutes and can quickly freeze to a solid state. This ink can be difficult to remove from the stainless steel flexure chutes. As a result, the ink can remain on the chutes, and may melt on the next cycle and contaminate the head.

Currently available coatings for ink jet printhead front faces are suitable for their intended purposes. However a need remains for an improved printhead front face coating that reduces or eliminates wetting, drooling, or flooding of UV or solid ink over the printhead front face. There further remains a need for an improved printhead front face coating that is robust to withstand maintenance procedures such as wiping of the printhead front face. There further remains a need for an improved flexure chute and further remains a need for an improved flexure chute that can improve maintenance cycle function and removal of ink into the waste tray.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a low adhesion surface coating for an ink jet printhead front face, wherein the coating comprises an oleophobic polymeric material, wherein, when the surface coating is disposed on an ink jet printhead front face surface, jetted drops of ultra-violet gel ink or jetted drops of solid ink exhibit very little adhesion towards the surface. The adhesion is measured by the sliding angle of the ink drop, wherein the lower the sliding angle, the lower the adhesion between the ink drop and the surface. In embodiments, low adhesion herein means a low sliding angle, wherein the low sliding angle is from less than about 25° to less than about 30°, when measured with ultra-violet curable gel ink or solid ink, with the printhead front face surface. In embodiments, the coating provides this property even after many wiping cycles thereby preventing ink contamination and allowing ink droplets to roll off the front face leaving behind no residue.

In embodiments, a coating for an ink jet printhead front face, wherein the coating comprises a low adhesion coating, wherein when the low adhesion coating is disposed on an ink jet printhead front face surface, jetted drops of ultra-violet gel ink or jetted drops of solid ink exhibit a low sliding angle with the printhead front face surface, wherein the low sliding angle is less than about 1° to less than about 30°.

Also described is an ink jet printhead comprising a front face having disposed on a surface thereof a low adhesion coating comprising an oleophobic polymeric material wherein jetted drops of ultra-violet gel ink or jetted drops of solid ink exhibit a low sliding angle, wherein the low sliding angle is less than from about 1° to less than about 30°, or less than about 25° to less than about 30°, or from about 1° to less than about 20°, or from about 1° to less than about 15°, with the printhead front face surface having the low adhesion coating.

In further embodiments, a printing apparatus comprising an ink jet printhead comprises a front face having disposed on a surface thereof a low adhesion coating comprising an oleophobic polymeric material wherein jetted drops of ultra-violet gel ink or jetted drops of solid ink exhibit a sliding angle of less than from about 1° to less than about 15° or less than about 25° to less than about 30°, with the printhead front face surface having the coating.

In further embodiments, a printing apparatus comprising an ink jet printhead comprises a front face having disposed on a surface thereof a low adhesion coating comprising an oleophobic polymeric material wherein jetted drops of ultra-violet gel ink or jetted drops of solid ink exhibit a contact angle of from greater than about 35° to greater than about 45°, in embodiments, a contact angle of about 35° to about 120°. When ink is filled into the printhead, it is desired to maintain the ink within the nozzle until it is time to eject the ink. Generally, the greater the ink contact angle the better (higher) the holding pressure. Holding pressure measures the ability of the aperture plate to avoid ink weeping out of the nozzle opening when the pressure of the ink tank (reservoir) increases. Advantageously, the present coatings providing in combination low adhesion and high contact angle for ultra-violet curable gel ink and solid ink which further provides the benefit of improved holding pressure or reduced or eliminated weeping of ink out of the nozzle.

Also described is a coating for an ink jet printhead flexure chute, wherein the coating comprises a low adhesion coating, wherein when the low adhesion coating is disposed on an ink jet printhead flexure chute surface, drops of ultra-violet gel ink or drops of solid ink exhibit a low sliding angle with the flexure chute surface, wherein the low sliding angle is less than about 1° to less than about 30°.

Also described is an ink jet printhead comprising at least one flexure chute having disposed on a surface thereof a low adhesion coating wherein drops of ultra-violet gel ink or drops of solid ink exhibit a low sliding angle with the flexure chute surface having the coating, wherein the low sliding angle is less than from about 1° to less than about 30°.

Also described is a printing apparatus comprising an ink jet printhead comprising a wiper assembly for removing waste ink from the printhead; and at least one flexure chute positioned to receive waste ink from the wiper assembly and direct the waste ink into a waste ink tray; wherein the at least one flexure chute has disposed on a surface thereof a low adhesion coating wherein drops of ultra-violet gel ink or drops of solid ink exhibit a sliding angle less than from about 1° to less than about 30°.

DETAILED DESCRIPTION

Low adhesion coatings are provided for an ink jet printhead front face which resist contamination, drooling and flooding by ultra-violet (UV) curable phase change inks and solid inks (also referred to as phase change inks) and which properties remain even after many purge/maintenance cycles. In embodiments, the present coatings exhibit very low adhesion with UV ink and solid ink as measured by a low sliding angle so that ink drops on the printhead front face roll off and leave no residue. The ink jet printhead front face coatings herein enable production of high quality, high throughput, digitally printed images with ultra-violet gel ink or solid ink that is ejected from a printhead, wherein the images are free of print defects due to misdirected droplets or missing jets caused by front face drooling of the ink experienced with previous printhead front face coatings.

The low adhesion coatings disclosed herein exhibits suitable abrasion characteristics for use as surface coatings for the printhead to avoid excessive wear upon usage or wiping. In embodiment, the present coating can be made by crosslinking a diisocyanate with a hydroxyl-functionalized polyester in a solvent in the presence of a hydroxyl functionalized polysiloxane crosslinking material and optionally, in specific embodiments, a second crosslinking material comprising a fluoro crosslinking material. The low adhesion coatings can be disposed on a printhead, such as on a printhead front face. Any suitable method can be used for applying the low adhesion coating to the surface of the printhead. Suitable techniques for applying the coating include spray, flow and dip coating techniques. In one embodiment, these ingredients can be formulated into a polyurethane coating solution and applied onto the surface of the printhead.

The printhead aperture plate (or orifice plate or print head front face plate) can be made of any suitable material and can be of any configuration suitable to the device. Orifice plates of square or rectangular shapes are typically selected due to ease of manufacture. Orifice plates can be made of any suitable composition. In embodiments, aperture plates or orifice plates are composed of stainless steel, steel, nickel, copper, aluminum, polyimide, or silicon. Orifices plates can also be made of stainless steel selectively plated with a braze material such as gold. Thin transparent films may be obtained after curing the coating in a heating oven.

Figure 2:
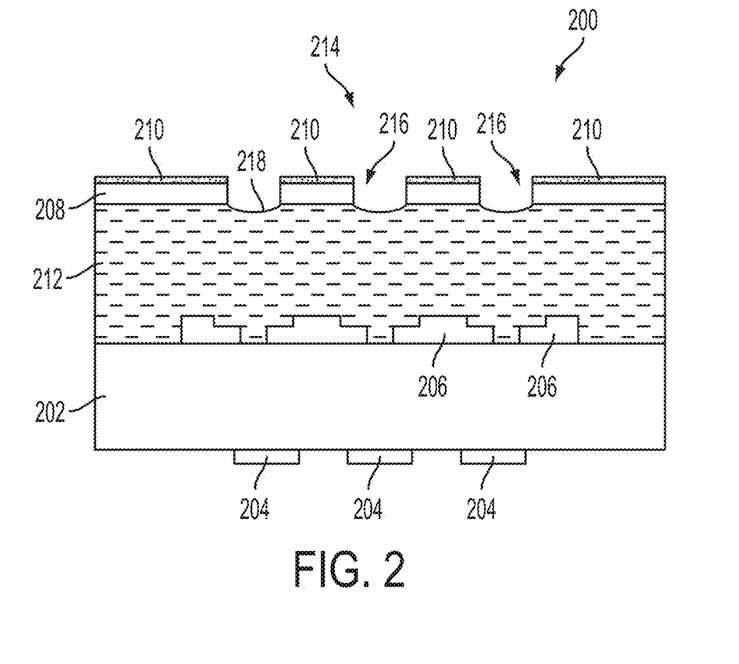
FIG. 2 is an illustration of a cross-section of a printhead front face having a low adhesion coating disposed thereon in accordance with the present disclosure.

The low adhesion coatings herein can be used with any type of print head. Referring to FIG. 2, a printhead 200 having the present low adhesion coating disposed thereon is illustrated in accordance with an embodiment of the present disclosure. Printhead 200 includes a base substrate 202 with transducers 204 on one surface and acoustic lenses 206 on an opposite surface. Spaced from the base substrate 202 is a liquid level control plate 208. A low adhesion coating 210 in accordance with the present disclosure is disposed along plate 208. The base substrate 202 and the liquid level control plate 208 define a channel which holds a flowing liquid 212. The liquid level control plate 208 contains an array 214 of apertures 216. The transducers 204, acoustic lenses 206, and apertures 216 are all axially aligned such that an acoustic wave produced by a single transducer 204 will be focused by its aligned acoustics 206 at approximately a free surface 218 of the liquid 212 in its aligned aperture 216. When sufficient power is obtained a droplet is emitted from surface 218.

The low adhesion coating 210 in accordance with the present disclosure is disposed on the printhead front face along plate 208 and provides the printhead front face with sliding angle characteristics to prevent ink from accumulating near the nozzles and interfering with the jetting of the ink droplets. In specific embodiments, the low adhesion coating 210 provides the printhead front face with sliding angle characteristics such that satellite droplets of UV gel ink and solid ink landing on the nozzle plate exhibit a low sliding angle, wherein the low sliding angle is less than about 25° to less than about 30° with the printhead front face surface having the coating.

Figure 3:
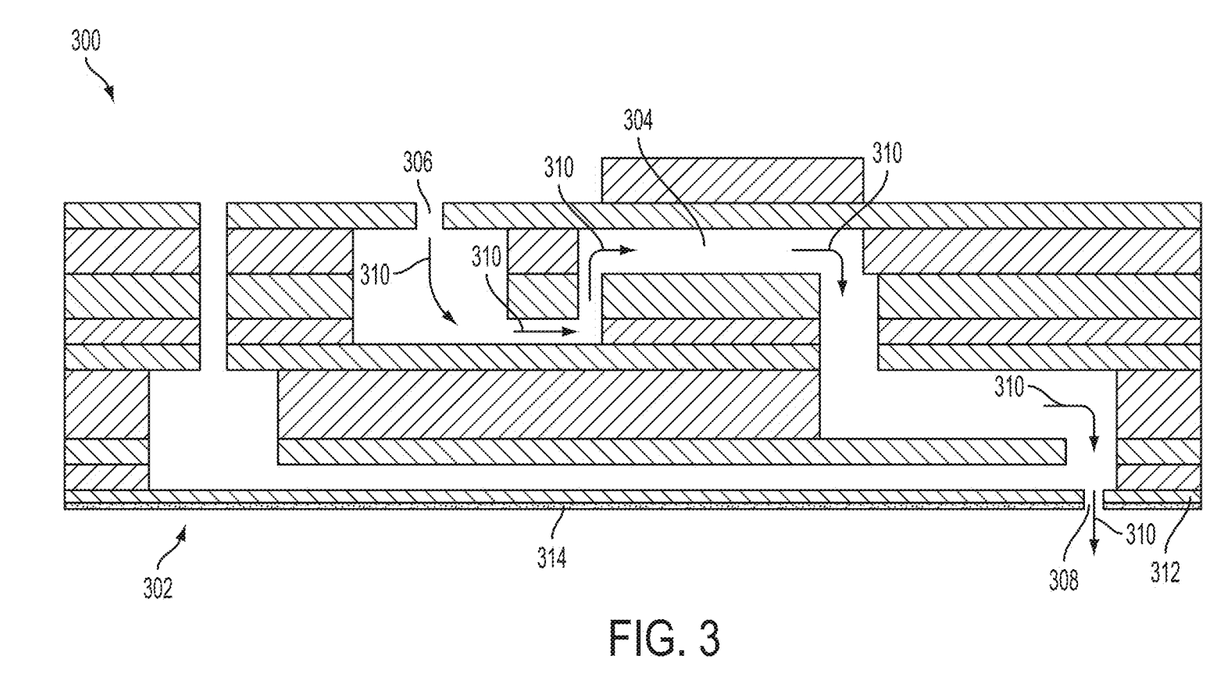
FIG. 3 an illustration of a cross-section of another printhead front face having a low adhesion coating disposed thereon in accordance with the present disclosure.

FIG. 3 illustrates another embodiment of a printhead 300 having a low adhesion coating disposed thereon in accordance with the present disclosure. In FIG. 3, a drop on demand ink jet print head 300 has a body 302 which includes one or more ink pressures chambers 304 coupled to or in communication with one or more ink sources 306. Ink jet print head 300 has one or more ink ejection means such as orifices or nozzle/outlets 308. A typical ink jet printer includes a plurality of ink pressure chambers 304 with each pressure chamber 304 coupled to one or more nozzle/outlets 308. For simplification, a single outlet 308 is illustrated in FIG. 3. Each nozzle/outlet 308 is coupled to or in communication with an ink pressure chamber 304 by way of an ink passage indicated by arrows 310. Ink passes through nozzle/outlet 308 during ink drop formation. Ink drops travel in a direction along path 310 from nozzle outlets 308 toward a print medium (not shown) which is spaced from nozzle/outlets 308. Nozzle/outlets 308 can be formed in an orifice plate or print head front face plate 312 contained on body 302 on the outlet side of the ink jet print head 300. A low adhesion coating 314 in accordance with the present disclosure is disposed along the orifice plate 312.

Figure 4A:
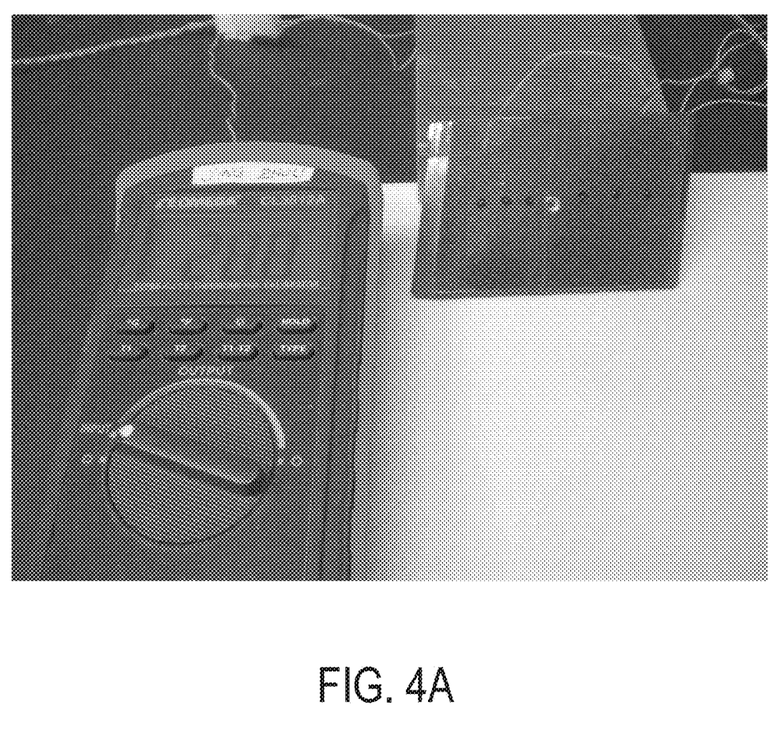
FIGS. 4A, 4B, and 4C demonstrate the self-cleaning property of a low adhesion coating in accordance with the present disclosure on the left hand side of the stainless plate elevated at a sliding angle of about 30° as compared to the uncoated right side of the stainless plate.
Figure 4B:
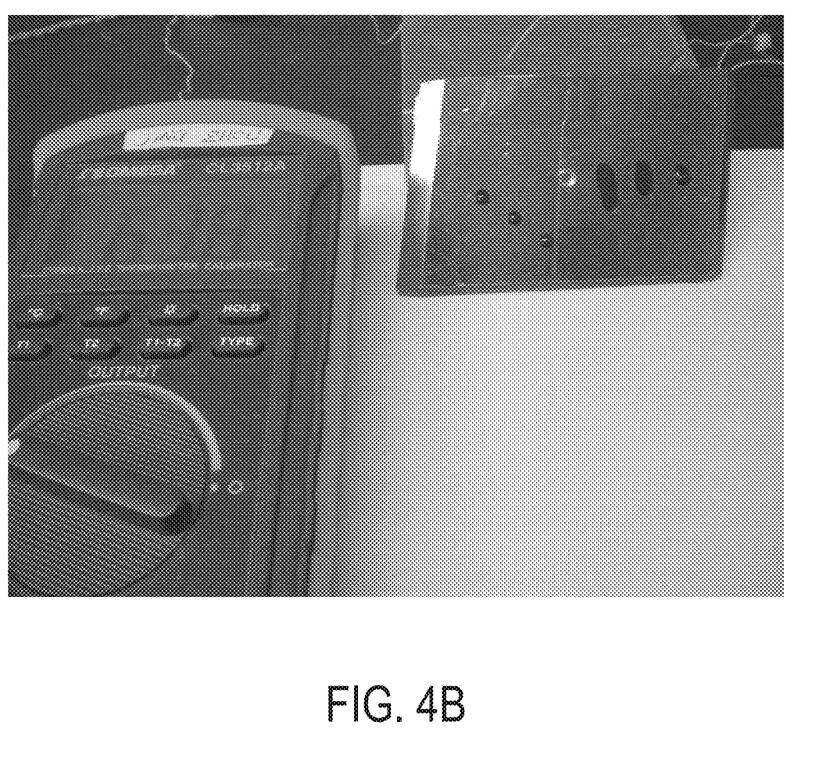
Figure 4C:
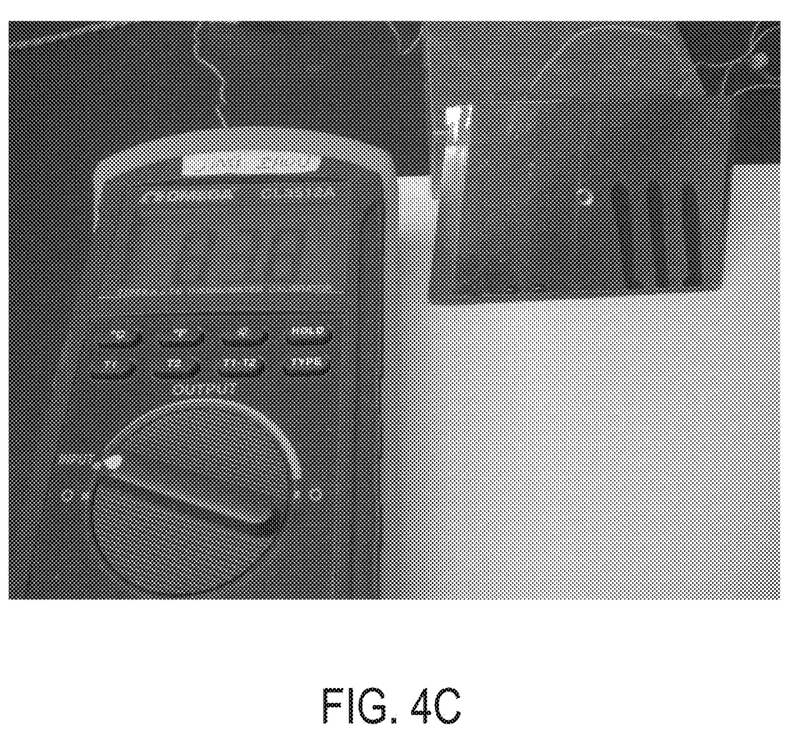

The low sliding angle, self-cleaning, behavior of the low adhesion coating on the UV gel ink is illustrated in FIGS. 4A, 4B, and 4C where the low adhesion coating in accordance with the present disclosure is on the left side of the stainless steel plate, and the right hand side of the plate is uncoated. As the plate, elevated at an angle of about 30°, is heated up from room temperature, a film is formed as the drops flow down the stainless plate on the right hand side and sticks to it. However on the left hand side, the drops slide down the plate without leaving any residue, illustrating the self-cleaning behavior of the low adhesion coating.

In specific embodiments, the printhead front face coatings herein provide the printhead front face with sliding angle characteristics such that satellite droplets of UV gel ink and solid ink landing on the nozzle plate exhibit a low sliding angle, wherein the low sliding angle is less than about 25° to less than about 30°, less than about 20°, or less than about 15°. In embodiments, the coatings provide a low sliding angle with UV gel or solid ink of from about 1° to less than about 30°, from about 1° to less than about 25°, or from about 1° to less than about 20°, or from about 1° to less than about 15°.

In specific embodiments, the printhead comprises a front face having disposed on a surface thereof a low adhesion coating comprising an oleophobic polymeric material wherein jetted drops of ultra-violet gel ink or jetted drops of solid ink exhibit a contact angle of from about 35° to about 120°, in specific embodiments a contact angle greater than about 35° or greater than about 45° with the surface coating. The greater the ink contact angle the higher the holding pressure. Holding pressure measures the ability of the aperture plate to avoid ink weeping out of the nozzle when the pressure of the ink tank (reservoir) increases. In embodiments, the present coatings provide in combination low adhesion and high contact angle for ultra-violet curable gel ink and solid ink which advantageously affects the holding pressure. In specific embodiments, the coatings herein provide a low sliding angle of from about 1° to about 30°, in specific embodiments less than about 30° or less than about 25°, and a contact angle of from about 35° to about 120°, in specific embodiments a contact angle greater than about 35° or greater than about 45°, in specific embodiments when measured with 3 microliter drops of UV ink and 1 microliter drops of solid ink.

In embodiments, the coating herein is for an ink jet printhead flexure chute, wherein the coating comprises a low adhesion coating, wherein when the low adhesion coating is disposed on an ink jet printhead flexure chute surface, drops of ultra-violet gel ink or drops of solid ink exhibit a low sliding angle with the flexure chute surface, wherein the low sliding angle is less than about 1° to less than about 30°.

The flexure chutes can comprise any suitable or desired material and configuration. In embodiments, the flexure chute or chutes comprise a substrate comprising steel, stainless steel, polyimide, silicon, nickel, copper, or aluminum having the low adhesion coating disposed thereon.

In embodiments, an ink jet printhead comprises at least one flexure chute having disposed on a surface thereof a low adhesion coating wherein jetted drops of ultra-violet gel ink or jetted drops of solid ink exhibit a low sliding angle with the flexure chute surface having the coating, wherein the low sliding angle is less than from about 1° to less than about 30°.

In further embodiments, a printing apparatus comprises an ink jet printhead comprising a wiper assembly for removing waste ink from the printhead; and at least one flexure chute positioned to receive waste ink from the wiper assembly and direct the waste ink into a waste ink tray; wherein the at least one flexure chute has disposed on a surface thereof a low adhesion coating wherein jetted drops of ultra-violet gel ink or jetted drops of solid ink exhibit a sliding angle less than from about 1° to less than about 30°. In embodiments, two or more flexure chutes are provided and positioned to receive waste ink from the wiper assembly and direct the waste away such as into a waste ink tray.

Figure 5:
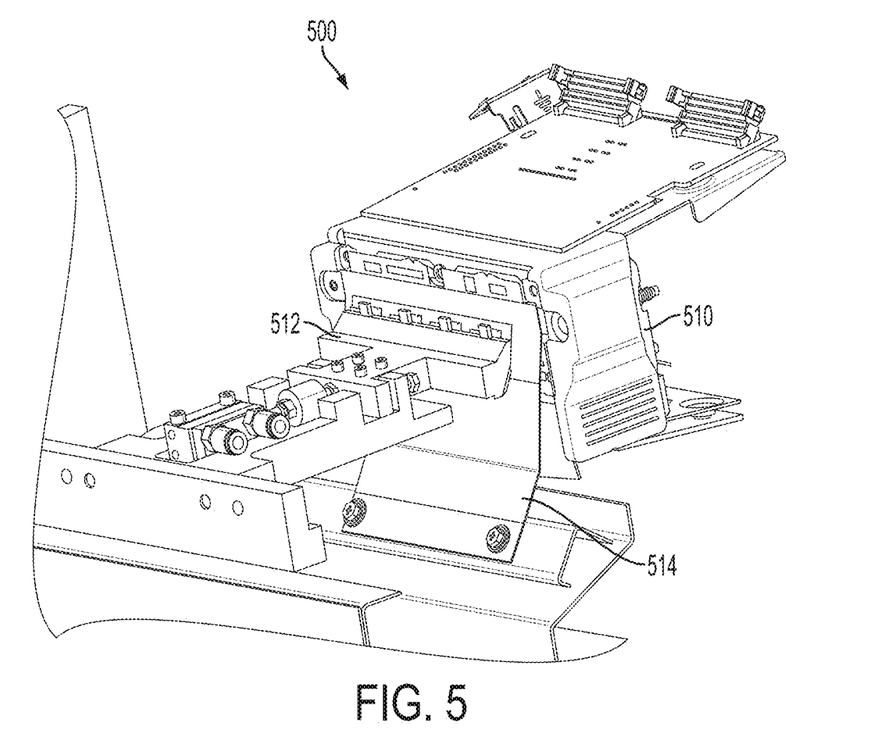
FIG. 5 is an illustration of an ink jet printhead, wiper assembly, and flexure chute.

Referring to FIG. 5, an ink jet printhead apparatus 500 is shown including printhead 500, wiper assembly 512 in communication with printhead 500 for cleaning waste ink off of printhead 500, and flexure chute 514 for receiving waste ink from wiper assembly 512 and directing waste ink away from printhead.

Figure 6:
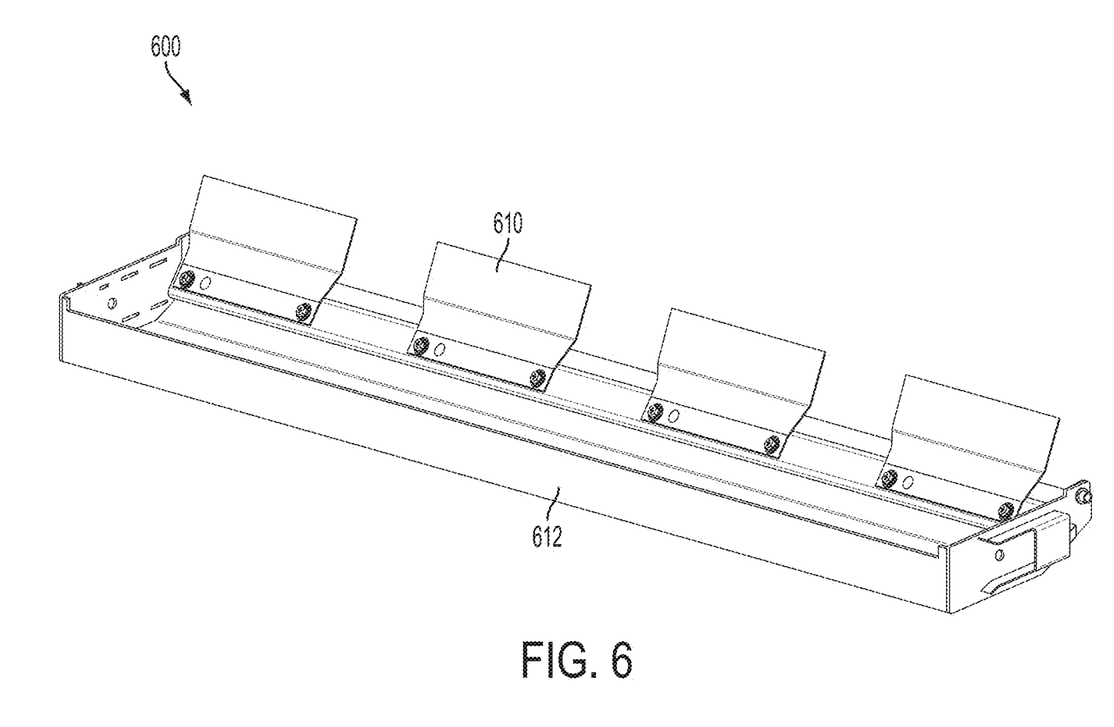
FIG. 6 is an illustration of a waste ink tray assembly with flexure chutes.

FIG. 6 illustrates a waste ink tray assembly 600 having flexure chutes 610 for directing waste ink into waste ink tray 612. Waste ink tray 612 is typically designed to be removable and can be removed from the ink jet printhead apparatus for emptying of waste ink and, if desired, cleaning of the waste ink tray.

In embodiments, low adhesion coating comprises a suitable polymer or oligomer containing an isocyanate functional group; a suitable polymer or oligomer containing a hydroxyl functional group; a suitable hydroxyl functionalized polymer or oligomer containing at least one polysiloxane unit; and optionally, a hydroxyl functionalized fluoro-crosslinking material. The printhead front face low adhesion coating herein can, in embodiments, comprise an isocyanate, a polylol; and a hydroxyl functionalized polysiloxane. In one embodiment, the low adhesion coating herein can comprise Components A, B, and C, wherein Component A can be a hydroxyl functionalized polyester, such as Desmophen® (available from Bayer Materials Science); Component B can be an isocyanate, such as Desmodur® or Bayhydur® (available from Bayer Materials Science); and Component C can be a hydroxyl functionalized polysiloxane crosslinking material, such as BYK-Silclean® (available from BYK Additives and Instruments).

Component A of the low adhesion coating can be any suitable polymer or oligomer containing hydroxyl (—OH) functional groups. For example, Component A can be selected from the group consisting of hydroxyl functional polymers or oligomers such as polyvinyls, polystyrenes, polyacrylates, polyester, polyethers, and mixtures thereof. In a specific embodiment, Component A is a hydroxyl functional polyacrylate resin sold under the name Desmophen® A 870 BA available from Bayer Materials Science.

Component B of the low adhesion coating can be any suitable polymer or oligomer containing isocyanate (—NCO) functional groups. For example, Component B can be selected from the group consisting of isocyanate functional polymers or oligomers such as polyvinyls, polystyrenes, polyester, polyacrylates, and mixtures thereof. In embodiments, the isocyanate can be selected from the group consisting of diphenylmethane diisocyanate, toluene diisocyanate, hexamethylene diisocyanate, isophorone diisocyanate, or suitable polymer or oligomer containing isocyanate (—NCO) functional groups, and mixtures thereof. In a specific embodiment, Component B is a solvent free aliphatic isocyanate resin based on hexamethylene diisocyanate sold under the name Desmodur® N 3300 A available from Bayer Materials Science.

Component C of the low adhesion coating can be any suitable hydroxyl functionalized polymer or oligomer containing polysiloxane unit/s. For example, Component C can be selected from the group consisting of hydroxyl functionalized polymers or oligomers containing polysiloxane unit/s such as polyvinyls, polystyrenes, polyacrylates, polyethers, and mixtures thereof. In a specific embodiment, Component C is a polymer consisting of polysiloxane side-chains on hydroxyl-functional polyacrylate backbone sold under the name BYK-Silclean® 3700 available from BYK Additives and Instruments.

Optionally, the low adhesion coatings herein can include a Component D comprising a fluoro-crosslinking material. Any suitable fluoro-crosslinking material can be selected. In embodiments, the fluoro-crosslinking material is a hydroxyl functionalized polymer modifier sold under the name Fluorolink®, for example, Fluorolink-D®, Fluorolink-D10H®, or Fluorolink-E10H®, available from Solvay Solexis.

The components of the low adhesion coating can be present in any suitable amount. For example, Component A can be present in an amount of from about 40 to about 80, or from about 55 to 70 weight percent based upon the total weight of the low adhesion coating, although not limited. Component B can be present in an amount of from about 15 to about 50, or from about 20 to about 45 weight percent based upon the total weight of the low adhesion coating, although not limited. Component C can be present in an amount of from about 0.1 to about 15, or from about 1 to about 10 weight percent based upon the total weight of the low adhesion coating, although not limited. Optional Component D, if present, can be present in an amount of from about 0.01 to about 5, or from about 0.1 to about 3 weight percent based upon the total weight of the low adhesion coating, although not limited.

The coatings herein can be applied to the ink jet printhead front face by any suitable method such as dip coating, spray coating, spin coating, flow coating, stamp printing, and blade techniques. An air atomization device such as an air brush or an automated air/liquid spray can be used for spray coating. The air atomization device can be mounted on an automated reciprocator that moves in a uniform pattern to cover the surface of the front face including the ink ejectors and ejector surfaces with a uniform coating. The use of a doctor blade is another technique that can be employed to apply the coating material. In flow coating, a programmable dispenser is used to apply the coating material.

For coating on aperture plates with nozzles, after application of the coating, a vacuum can optionally be applied to remove excess coating solution that may remain in the ejector channels or ink jet orifices. Purging with pressurized air can also be used to remove coating from the channels or orifices by forcing the coating therethrough.

The wet coating can be any suitable thickness. In embodiments, the wet coating disposed on the front face is from about 8 to about 80 microns, or from about 30 to about 60 microns thick.

The coating can be heat cured to an appropriate temperature for drying and curing. In embodiments, the coating is disposed on the printhead front face and then heated. In embodiments, the coating is heated to a temperature of from about 100° C. to about 180° C. for about 5 to about 60 minutes. In embodiments, after drying and curing, the low adhesions coating has a thickness of from about 0.02 micrometer to about 5 micrometers or from about 0.05 micrometer to about 3 micrometers.

The ink jet printhead comprising a front face having surfaces coated with the present coating can be used with any suitable ink. In a specific embodiment, the ink comprises a phase change or solid ink, or a UV gel ink. Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions. Compositions suitable for use as phase change ink carrier compositions are known. Exemplary suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

In embodiments, the ink can be a UV curable gel ink composition comprising an optional colorant and a phase change ink vehicle comprising a radiation curable monomer or prepolymer; a photoinitiator; a reactive wax; and a gellant. For example, suitable inks for use herein are described in U.S. patent application Ser. No. 11/290,202, filed Nov. 30, 2005, entitled "Phase Change Inks Containing Photoinitiator With Phase Change Properties and Gellant Affinity," with the named inventors Peter G. Odell, Eniko Toma, and Jennifer L. Belelie, the disclosure of which is totally incorporated herein by reference, can be used, wherein the gellant is a compound of the formula wherein $R_1$ is (i) an alkylene group, (ii) an arylene group, (iii) an arylalkylene group, (iv) an alkylarylene group; $R_2$ and $R_2'$ each, independently of the other, are (i) alkylene groups, (ii) arylene groups, (iii) arylalkylene groups, (iv) alkylarylene groups; $R_3$ and $R_3'$ each, independently of the other, are either (a) photoinitiating groups, or (b) a group which is (i) an alkyl group, (ii) an aryl group, (iii) an arylalkyl group, (iv) an alkylaryl group, provided that at least one of $R_3$ and $R_3'$ is a photoinitiating group; and X and X' each, independently of the other, is an oxygen atom or a group of the formula —$NR_4$—, wherein $R_4$ is (i) a hydrogen atom, (ii) an alkyl group, (iii) an aryl group, (iv) an arylalkyl group, (v) an alkylaryl group. The ultra-violet curable gellant ink suitable for use with the present front face coating can further be selected from U.S. Patent Publication 20070123606, published May 31, 2007, entitled "Phase Change Inks Containing Curable Amide Gellant Compounds," with the named inventors Eniko Toma, Jennifer L. Belelie, and Peter G. Odell, the disclosure of which is totally incorporated herein by reference. The ultra-violet curable gellant ink can also be selected from the inks described in U.S. Pat. No. 7,279,587 of Peter G. Odell, Eniko Toma, and Jennifer L. Belelie, entitled "Photoinitiator with Phase Change Properties and Gellant Affinity," the disclosure of which is totally incorporated herein by reference, and U.S. Pat. No. 7,276,614 of Eniko Toma, Peter G. Odell, Adela Goredema, and Jennifer L. Belelie, entitled "Curable Amide Gellant Compounds," issued Oct. 2, 2007, the disclosure of which is hereby incorporated by reference herein in its entirety. The ultra-violet curable gel inks can be prepared by any desired or suitable method, such as the methods described in U.S. Pat. No. 7,259,275, U.S. Pat. No. 7,279,587, U.S. Pat. No. 7,271,284, the disclosures of each of which are hereby incorporated by reference herein in their entireties.

Solid ink is typically jetted at a temperature of about 105° C. and has a melt viscosity at a jetting temperature of about 10 centipoise. Ultra-violet curable phase change ink is typically jetted at a temperature of about 75° C. and has a melt viscosity at jetting temperature of about 10 centipoise.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Tables 1-4 set forth Control Example 1, Examples 2-7, and Comparative Examples 8 and 9. Coating Examples 1-7 were prepared by mixing 19.6 grams of hydroxyl-terminated polyacrylate, Desmophen® A870 BA from Bayer Material Science, and 10.3 grams of hexamethylene diisocyanate, Desmodur® N-3300A from Bayer Material Science, in n-butyl acetate, in the amounts shown in Tables 1-4. The polysiloxane cross linking material, Silclean® 3700, a hydroxyl functional silicone modified polyacrylate from BYK, was added in varying amounts, typically from 0 to 10% by weight relative to the total solid polymer weight of the formulation (does not include weight of solvent). All of the components and solvent were stirred in a beaker and the resulting coating formulation was cast onto a Mylar® sheet using a drawbar coater. The coating was cured and dried at 135° C. for about 30 to about 60 minutes, yielding the low-adhesion coating disclosed herein. Optionally, a fluoro cross-linking material, such as materials known as Fluorolink®, particularly Fluorolink-D®, Fluorolink-D10H®, and Fluorolink-E10H®, available from Solvay Solexis, can be added to the coating solution in any suitable amount, such as from about 0.01 to about 5% by weight based upon the total weigh of the coating solution to increase the contact angle and the oleophobicity of the final coating.

For Examples 1-7, each coating was disposed on a separate 3 inch by 1 inch Mylar® sheet, the sheet was affixed onto a glass slide, and contact angle and sliding angle towards water, hexadecane, solid ink, and ultra-violet curable phase change ink were recorded as given in Tables 1-4. Contact angle and sliding angle measurements were conducted on an OCA20 goniometer from Dataphysics, which consists of a computer-controlled automatic liquid deposition system, computer controlled tilting stage and a computer-based image processing system. In a typical static contact angle measurement, about 5 microliters of the test liquid droplets (water, hexadecane), about 1 microliter of solid ink, or about 3 microliters of UV ink were gently deposited on the testing surface and the static angle was determined by the computer software (SCA20) and each reported data is an average of >5 independent measurements. Sliding angle measurement was done by tilting the base unit at a rate of 1°/sec with an about 10 microliter droplet for water and hexadecane, about 1 and about 3 microliter droplet for solid ink and UV ink, respectively, using titling base unit TBU90E. The sliding angle is defined as the angle where the test liquid droplet starts to slide (or move). For Example 8, a 3 by 1 inch piece of Teflon® sheet was cut and placed on the goniometer, and contact angle and sliding angles were recorded as described above. Example 9 is a printhead as described in U.S. Pat. No. 5,867,189, which is hereby incorporated by reference herein in its entirety, comprised of stainless steel having a polytetrafluoroethylene disposed on the front face of the printhead.

The water and hexadecane were applied to the surface coatings at room temperature. A cyan solid ink, Xerox Color Cube™ cyan solid ink available from Xerox Corporation, was applied to the surface coating heated to 105° C. The ultra-violet curable gel ink was prepared according to the descriptions in U.S. Pat. No. 7,279,587 and was applied to the surface coating heated to 75° C.

TABLE 1

| Example | Coating composition | | | | Water | |
| --- | --- | --- | --- | --- | --- | --- |
| | Desmophen® A 870 BA | Desmodur® N 3300 A | % Silclean® | Fluorolink- D® | Contact angle | Sliding angle |
| 1 (control) | 65.6% | 34.4% | 0% | 0% | ~70° | ~51° |
| 2 | 64.3% | 33.8% | 2% | 0% | ~93° | ~30° |
| 3 | 60.7% | 31.9% | 8% | 0% | ~100° | ~23° |
| 4 | 64.0% | 33.6% | 2% | 0.5% | Not measured | Not measured |
| 5 | 63.0% | 33.0% | 2% | 2% | Not measured | Not measured |
| 6 | 60.3% | 31.2% | 8% | 0.5% | Not measured | Not measured |
| 7 | 59.1% | 31.0% | 8% | 2% | Not measured | Not measured |
| 8 | 0% | 0% | PTFE film | | ~118° | ~64° |
| Printhead* | 0% | 0% | PTFE front face coating | | ~130° | >90° |

TABLE 2

| Example | Coating composition | | | | Hexadecane | |
| --- | --- | --- | --- | --- | --- | --- |
| | Desmophen® A 870 BA | Desmodur® N 3300 A | % Silclean® | Fluorolink- D® | Contact angle | Sliding angle |
| 1 (control) | 65.6% | 34.4% | 0% | 0% | ~22° | flows |
| 2 | 64.3% | 33.8% | 2% | 0% | ~31° | ~5° |
| 3 | 60.7% | 31.9% | 8% | 0% | ~34° | ~2° |
| 4 | 64.0% | 33.6% | 2% | 0.5% | ~59° | ~21° |
| 5 | 63.0% | 33.0% | 2% | 2% | ~62° | ~22° |
| 6 | 60.3% | 31.2% | 8% | 0.5% | ~55° | ~16° |
| 7 | 59.1% | 31.0% | 8% | 2% | ~62° | ~21° |
| 8 | 0% | 0% | PTFE film | | ~48° | ~31° |
| Printhead* | 0% | 0% | PTFE front face coating | | ~71° | ~64° |

TABLE 3

| Example | Coating composition | | | | Solid Ink | |
| --- | --- | --- | --- | --- | --- | --- |
| | Desmophen® A 870 BA | Desmodur® N 3300 A | % Silclean® | Fluorolink- D® | Contact angle | Sliding angle |
| 1 (control) | 65.6% | 34.4% | 0% | 0% | 23° | flows |
| 2 | 64.3% | 33.8% | 2% | 0% | 51° | 14° |
| 3 | 60.7% | 31.9% | 8% | 0% | 53° | 10° |
| 4 | 64.0% | 33.6% | 2% | 0.5% | 65° | 23° |
| 5 | 63.0% | 33.0% | 2% | 2% | 67° | 25° |
| 6 | 60.3% | 31.2% | 8% | 0.5% | 62° | 17° |
| 7 | 59.1% | 31.0% | 8% | 2% | 65° | 22° |
| 8 | 0% | 0% | PTFE film | | 63° | >90° |
| Printhead* | 0% | 0% | PTFE front face coating | | Not measured | Not measured |

TABLE 4

| Example | Coating composition | | | | UV Ink | |
|---|---|---|---|---|---|---|
| | Desmophen® A 870 BA | Desmodur® N 3300 A | % Silclean® | Fluorolink-D® | Contact angle | Sliding angle |
| 1 (control) | 65.6% | 34.4% | 0% | 0% | 17° | flows |
| 2 | 64.3% | 33.8% | 2% | 0% | 36° | 16° |
| 3 | 60.7% | 31.9% | 8% | 0% | 41° | 11° |
| 4 | 64.0% | 33.6% | 2% | 0.5% | 59° | 19° |
| 5 | 63.0% | 33.0% | 2% | 2% | Not measured | Not measured |
| 6 | 60.3% | 31.2% | 8% | 0.5% | Not measured | Not measured |
| 7 | 59.1% | 31.0% | 8% | 2% | Not measured | Not measured |
| 8 | 0% | 0% | PTFE film | | 58° | >90° |
| 9 Printhead* | 0% | 0% | PTFE front face coating | | Not measured | Not measured |

*printhead described in U.S. Pat. No. 5,867,189

Tables 1-4 summarize contact angle and sliding angle measurement data for control Example 1, Examples 2-7 comprising printhead front face coatings in accordance with the present disclosure, Example 8 comprising a PTFE film, and Example 9, a printhead as described in U.S. Pat. No. 5,867, 180. Contact and sliding angle measurements were determined using a DataPhysics® Contact Angle System.

While the present coatings exhibit advantageous properties for improving the contamination/drooling/flooding problem at time zero, these coatings must maintain these properties through the many wiping cycles used for printhead maintenance over the printhead life. To test the robustness of these coatings, the Crock (cloth) test with the Taber® Linear Abraser Model 5700 was performed on these coatings for up to >200 cycles. This test (originally designed to simulate blade cleaning for photoreceptors) is expected to be much more aggressive than wiping with a fluoro-silicone blade which is currently used in printhead maintenance systems. Results showed that the sliding angle of the present coatings remain unchanged against solid ink and UV ink after >200 wipes. In embodiments, the coating surface maintains a low sliding angle even after 200 cleaning cycles with a Crock cloth, wherein the low sliding angle is from about 1° to less than about 50° or from about 1° to less than about 30°.

In embodiments, the sliding angle of the ultra-violet curable gel ink on the low adhesion coating herein is very low at about 12° and any ultra-violet curable gel ink droplets immediately roll off without leaving any residue. This sliding angle remains low at about 12° even after more than about 200 wipes with a crock cloth resulting in immediate roll-off of any ultra-violet gel ink droplets with no residue left on the coating sample.

In further embodiments, the sliding angle of the solid ink on the low adhesion coating herein is very low at about 12° and any solid ink droplets immediately roll-off without leaving any residue. This sliding angle remains low at about 12° even after more than about 200 wipes with a crock cloth resulting in immediate roll-off of any solid ink droplets with no residue.

In embodiments, the sliding angle of ultra-violet gel ink on the present low adhesion coatings is very low at about 11° and any ultra-violet gel ink droplets immediately roll-off without leaving any residue. This sliding angle remains low at about 14° even after more than about 200 wipes with a crock cloth in the abrasion test and result in immediate roll-off of any ultra-violet gel ink droplets with no residue.

In further embodiments, the sliding angle of solid ink on the present low adhesion coatings is very low at about 15° and any solid ink droplets immediately roll-off without leaving any residue. This sliding angle remains low at about 15° even after more than about 200 wipes with a crock cloth in the abrasion test and result in immediate roll-off of any solid ink droplets with no residue left behind on the coating sample.

Example 10

A steel flexure chute was coated with a low adhesion coating in accordance with the present disclosure as follows. 28.03 grams of Desmophen® A 870 BA (Bayer Materials Science), 10.38 grams of Desmodur® N 3300 A (Bayer Materials Science) and 1.9 grams of Silclean® 3700 (BYK Inc.) were dissolved in 150 milliliters of ethyl acetate and stirred for 5 minutes to yield the coating solution. A clean stainless steel flexure chute part was dipped in the coating solution and removed. The part was then air dried for 5 minutes and cured at 130° C. for 30 minutes to give the final coated part. This coated part was mounted into the flexure chute assembly of the ink jet printhead assembly of FIG. 5 and machine tested.

Figure 7:
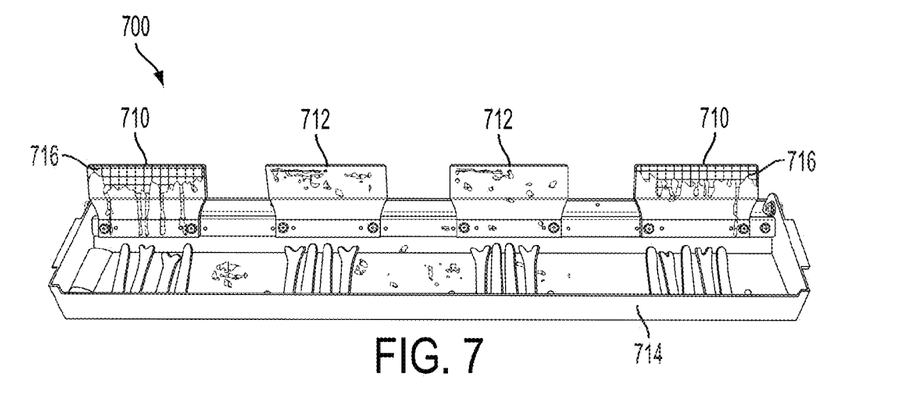
FIG. 7 is an illustration of a waste ink tray assembly having coated and uncoated flexure chutes.
Figure 8:
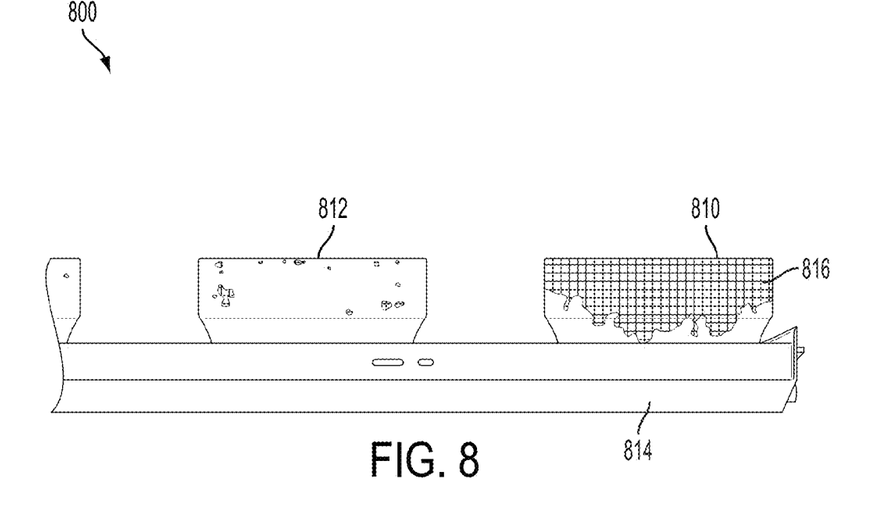
FIG. 8 is an illustration of a waste ink tray assembly having a coated and an uncoated flexure chute.
Figure 9:
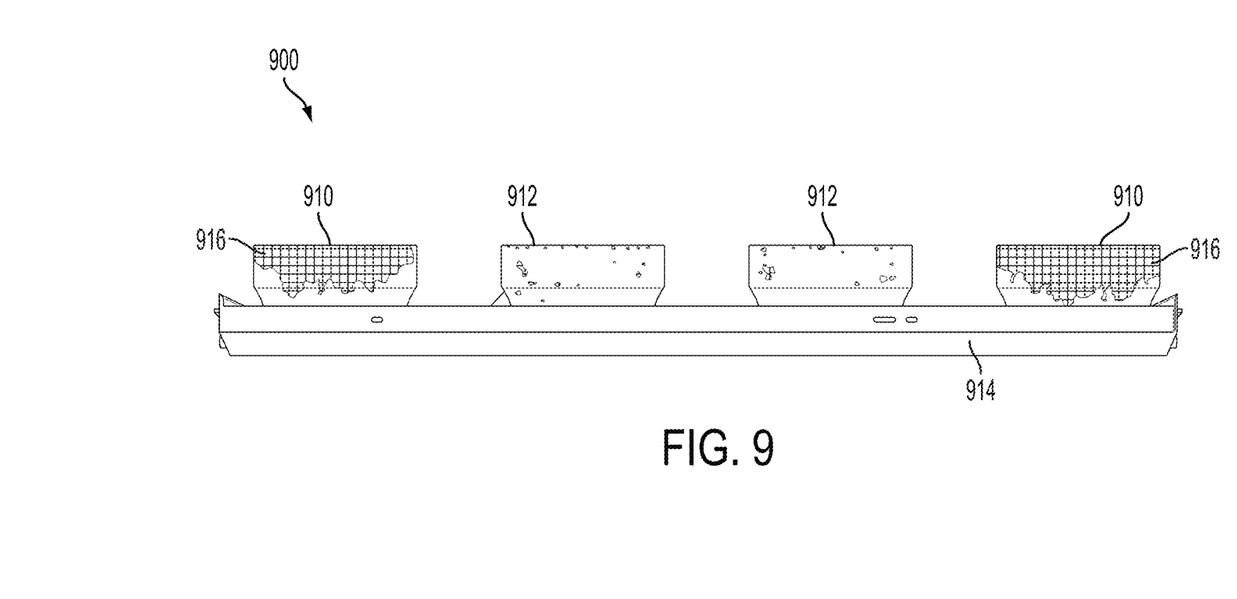
FIG. 9 is an illustration of a waste ink tray assembly having coated and uncoated flexure chutes.

Due to the low ink adhesion, most of the molten ink just rolls down the flexure chute into the waste tray without sticking or wetting the chute when a purge is done. Whatever minimal amount of ink that does remain behind and solidifies is easier to remove due to the low ink adhesion to the coated flexure chute surface. The coatings herein reduce or eliminate altogether waste ink contamination on flexure chutes. The coatings herein make it far easier to remove dried ink from the chutes when the tray is emptied. Testing has shown that the coated chutes develop far less contamination from ink than uncoated chutes. FIG. 7 illustrates a waste ink tray assembly 700 having uncoated outer chutes 710 and coated center chutes 712 emptying into waste ink tray 714. Ink contamination/ink build-up 716 can be seen on the uncoated outer chutes 710. FIG. 7 illustrates that there is far less waste ink contamination on the coated chutes 712. FIG. 8 illustrates a waste ink tray assembly 800 having uncoated chute 810, coated chute 812, and waste ink tray 814. Ink contamination/ink build-up 716 can be seen on the uncoated chute 810. FIG. 8 illustrates that there is far less waste ink contamination on the coated chute 812. FIG. 9 illustrates a waste ink tray assembly 900 having uncoated chutes 910, coated chute 912, and waste ink tray 914. Ink contamination/ink build-up 916 can be seen on the uncoated chutes 910. FIG. 9 illustrates that there is far less waste ink contamination on the coated chutes 912. By preventing ink build-up on the flexure chutes, the possibility of ink re-depositing on the printhead during subsequent maintenance cycles in minimized. Additionally, the present disclosure provides an improved visual experience wherein the flexure chutes maintain a clean appearance overtime. Further, the disclosure provides a cost effective solution wherein the materials used to prepare the low adhesion coating are available in bulk and are inexpensive.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A coating for an ink jet printhead flexure chute, wherein the coating comprises:
   a low adhesion coating, wherein when the low adhesion coating is disposed on an ink jet printhead flexure chute surface, drops of ultra-violet gel ink or drops of solid ink exhibit a low sliding angle with the flexure chute surface, wherein the low sliding angle is less than about 1° to less than about 30°.

2. The coating of claim 1, wherein the low sliding angle is from about 1° to less than about 20°.

3. The coating of claim 1, wherein the low sliding angle is from about 1° to less than about 15°.

4. The coating of claim 1, wherein the low adhesion coating comprises:
   a suitable polymer or oligomer containing an isocyanate functional group;
   a suitable polymer or oligomer containing a hydroxyl functional group;
   a suitable hydroxyl functionalized polymer or oligomer containing at least one polysiloxane unit; and
   optionally, a hydroxyl functionalized fluoro-crosslinking material.

5. The coating of claim 4, wherein the suitable polymer or oligomer containing an isocyanate functional group is selected from the group consisting of diphenylmethane diisocyanate, toluene diisocyanate, hexamethylene diisocyanate, isophorone diisocyanate, or suitable polymer or oligomer containing isocyanate (—NCO) functional groups, and mixtures thereof.

6. The coating of claim 1, wherein the low adhesion coating comprises:
   an isocyanate;
   a polylol;
   a hydroxyl functionalized polysiloxane; and
   optionally, a hydroxyl functionalized fluoro-crosslinking material.

7. An ink jet printhead comprising:
   at least one flexure chute having disposed on a surface thereof a low adhesion coating wherein jetted drops of ultra-violet gel ink or jetted drops of solid ink exhibit a low sliding angle with the flexure chute surface having the coating, wherein the low sliding angle is less than from about 1° to less than about 30°.

8. The ink jet printhead of claim 7, wherein the low sliding angle is from about 1° to less than about 20°.

9. The ink jet printhead of claim 7, wherein the low sliding angle is from about 1° to less than about 15°.

10. The ink jet printhead of claim 7, wherein the low adhesion coating comprises:
    a suitable polymer or oligomer containing an isocyanate functional group;
    a suitable polymer or oligomer containing a hydroxyl functional group;
    a suitable hydroxyl functionalized polymer or oligomer containing at least one polysiloxane unit; and
    optionally, a hydroxyl functionalized fluoro-crosslinking material.

11. The ink jet printhead of claim 10, wherein the suitable polymer or oligomer containing an isocyanate functional group is selected from the group consisting of diphenylmethane diisocyanate, toluene diisocyanate, hexamethylene diisocyanate, isophorone diisocyanate, or suitable polymer or oligomer containing isocyanate (—NCO) functional groups, and mixtures thereof.

12. The ink jet printhead of claim 11, wherein the low adhesion coating has a thickness of from about 0.02 micrometer to about 5 micrometers.

13. The ink jet printhead of claim 7, further comprising a wiper assembly for removing ink from the printhead, wherein the at least one flexure chute is positioned to receive waste ink from the wiper assembly and direct the waste ink into a waste ink tray.

14. The ink jet printhead of claim 7, further comprising a wiper assembly for removing ink from the printhead, wherein the ink jet printhead contains two or more flexure chutes and wherein the flexure chutes are positioned to receive waste ink from the wiper assembly and direct the waste ink into a waste ink tray.

15. The ink jet printhead of claim 7, wherein the flexure chute comprises a substrate comprising steel, stainless steel, polyimide, silicon, nickel, copper, or aluminum having the low adhesion coating disposed thereon.

16. A printing apparatus comprising an ink jet printhead comprising:
    a wiper assembly for removing waste ink from the printhead; and
    at least one flexure chute positioned to receive waste ink from the wiper assembly and direct the waste ink into a waste ink tray;
    wherein the at least one flexure chute has disposed on a surface thereof a low adhesion coating wherein jetted drops of ultra-violet gel ink or jetted drops of solid ink exhibit a sliding angle less than from about 1° to less than about 30°.

17. The printing apparatus of claim 16, wherein the coating comprises:
    a suitable polymer or oligomer containing an isocyanate functional group;
    a suitable polymer or oligomer containing a hydroxyl functional group;
    a suitable hydroxyl functionalized polymer or oligomer containing at least one polysiloxane unit; and
    optionally, a hydroxyl functionalized fluoro-crosslinking material.

18. The printing apparatus of claim 16, wherein the ink jet printhead contains two or more flexure chutes and wherein the flexure chutes are positioned to receive waste ink from the wiper assembly and direct the waste ink into a waste ink tray.

19. The printing apparatus of claim 16, wherein the flexure chute comprises a substrate comprising steel, stainless steel, polyimide, silicon, nickel, copper, or aluminum having the low adhesion coating disposed thereon.

20. The printing apparatus of claim 16, wherein jetted drops of ultra-violet gel ink or jetted drops of solid ink exhibit a contact angle of about 35° to about 120°.

* * * * *